(12) United States Patent (10) Patent No.: US 8,647,181 B2
Cornelissen et al. (45) Date of Patent: Feb. 11, 2014

(54) SLAUGHTERING INSTALLATION AND METHOD

(75) Inventors: Albertus Theodorus Johannes Joseph Cornelissen, Cuijk (NL); Erik Hendrikus Werner Peters, Boxmeer (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 0 days.

(21) Appl. No.: 13/639,372

(22) PCT Filed: Apr. 4, 2011

(86) PCT No.: PCT/NL2011/050228
§ 371 (c)(1),
(2), (4) Date: Nov. 13, 2012

(87) PCT Pub. No.: WO2011/126366
PCT Pub. Date: Oct. 13, 2011

(65) Prior Publication Data
US 2013/0052923 A1 Feb. 28, 2013

(30) Foreign Application Priority Data
Apr. 7, 2010 (NL) .................................. 2004521

(51) Int. Cl.
*A22B 1/00* (2006.01)
(52) U.S. Cl.
USPC .......................................................... 452/53
(58) Field of Classification Search
USPC ............. 452/53–56, 163, 166, 167, 180–184, 452/187, 188, 194
See application file for complete search history.

(56) References Cited

U.S. PATENT DOCUMENTS

| 2,854,690 | A | * | 10/1958 | O'Donnell ..................... 452/168 |
| 3,017,660 | A | | 1/1962 | Reeves |
| 3,475,785 | A | | 11/1969 | Woods |
| 3,490,092 | A | | 1/1970 | Harrison |
| 3,724,032 | A | * | 4/1973 | Harben, Jr. ...................... 452/63 |
| 3,833,966 | A | | 9/1974 | Harben, Jr. |
| 3,918,125 | A | * | 11/1975 | Strandine et al. ............... 452/54 |
| 3,956,794 | A | * | 5/1976 | Verbakel ........................ 452/168 |
| 4,354,296 | A | * | 10/1982 | Robinson ........................ 452/53 |
| 4,392,273 | A | * | 7/1983 | De Long ........................ 452/63 |
| 4,516,290 | A | * | 5/1985 | van Mil ........................ 452/118 |
| 7,597,615 | B2 | * | 10/2009 | van den Nieuwelaar et al. ............................. 452/182 |
| 8,216,031 | B2 | * | 7/2012 | Kleinsasser ..................... 452/52 |
| 8,272,927 | B2 | * | 9/2012 | Gasbarro ....................... 452/125 |
| 8,360,832 | B2 | * | 1/2013 | Janssen et al. ................. 452/136 |

FOREIGN PATENT DOCUMENTS

GB 1086063 10/1967
NL 298269 11/1965

* cited by examiner

*Primary Examiner* — Richard Price, Jr.
(74) *Attorney, Agent, or Firm* — Birch, Stewart, Kolasch & Birch, LLP

(57) ABSTRACT

A slaughtering installation for processing poultry is adapted to be used in combination with a conveying assembly for conveying poultry which is suspended from their legs in a transport direction. The slaughtering installation comprising a killing device with poultry positioning device for positioning the neck region of the poultry suspended from the conveying assembly, the killing device further comprising cutting device for cutting into the neck and thereby opening at least one blood vessel in the neck region of the poultry. The positioning device comprises a back neck guide along which the back side of the neck of the poultry is guided, and a breast neck guide along which the breast side of the neck of the poultry is guided.

21 Claims, 12 Drawing Sheets

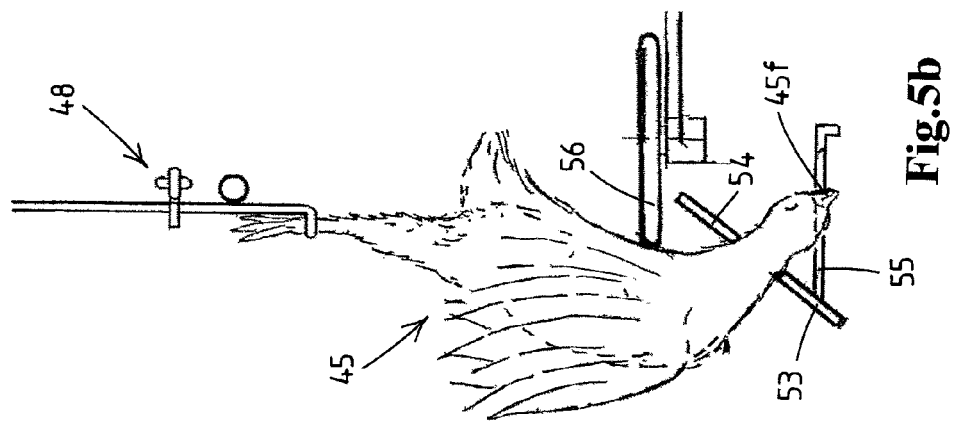
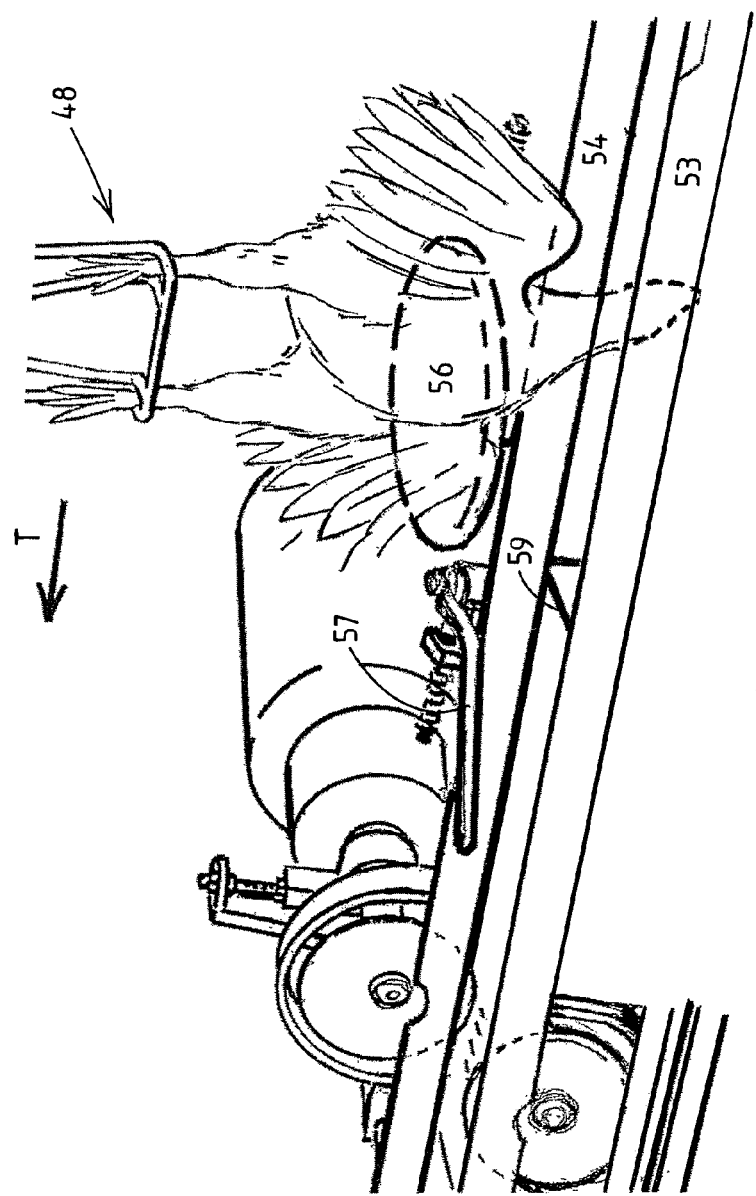

SLAUGHTERING INSTALLATION AND METHOD

The present invention relates to a slaughtering installation and method. In particular, the present invention relates to an installation which is adapted to be used in combination with a conveying assembly for conveying poultry which is suspended from their legs in a transport direction T. Such a slaughtering installation is used in poultry processing industry for successively killing poultry in large amounts. With slaughtering (killing) the action of mechanical opening of at least one blood vessel in the neck is meant.

Known slaughtering installations comprise a main killing device with main poultry positioning means for positioning the neck region of the poultry suspended from the conveying assembly, the main killing device further comprising main cutting means for cutting into the neck and thereby opening at least one blood vessel in the neck region of the poultry. In these slaughtering installations the poultry suspended from the conveying assembly enters the main killing device at an entry position S in which the poultry comes into contact with the main poultry positioning means, and is conveyed in direction T past the main cutting means until an exit position E in which the killed poultry exits the slaughtering installation.

The slaughtering installation is generally positioned upstream of a suspension (hanging) installation where birds are suspended from the conveyer, and upstream of a stunning installation. Subsequent to (downstream of) the slaughtering installation conventionally installations for scalding and defeathering are provided. Scalding may take place in a bath or by steam or humid hot air or any alternative medium.

A drawback of such known slaughtering installations is that a portion of the poultry is not killed. Common killing rates vary between 90-99% of the poultry being killed, in particular 93-97%. As a result, birds may enter the scalding installation alive, which is undesired from a viewpoint of animal welfare. In particular when steam scalding is applied: in a bath the live poultry will die from drowning, but steam scalding does not guarantee the poultry is killed. Hence, there is a chance of defeathering live poultry, which is undesired.

Factors that may contribute to this drawback are the large conveyance speed, differences in size of the poultry and ineffective positioning means for the neck region of the poultry.

To overcome this drawback, conventionally personnel is present to slaughter any poultry that is still alive downstream (seen in direction T) the exit position E, before scalding and defeathering the poultry. Such a manual post-cut diminishes the overall efficiency rate at which poultry is being processed, and enhances the costs.

The object of the present invention is to provide an improved slaughtering installation with improved killing rate. Preferably, the manual post-cut rate is reduced to less than 1.5% manual rework.

The slaughtering installation according to the invention is preferably used in poultry processing industry for successively killing poultry in large quantities, e.g. 2,000-18,000 birds per hour, more preferably between 5.000 and 13.500 birds per hour. The improved killing rate according to the invention is preferably obtained at these high conveyance rates. As such, the efficiency of the slaughtering process per conveying assembly is improved.

As indicated above, the slaughtering installation is generally positioned upstream of a suspension (hanging) installation, and upstream of a stunning installation. According to the present invention, it is both possible to first stun the poultry and subsequently suspend the poultry from their legs from a conveying assembly, or to first suspend and then stun the poultry. Common stunning methods are electrical stunning and stunning by gas. The conveying assembly from which the poultry is suspended thus conveys the poultry from the suspension installation, possibly via a stunning installation, in a transport direction T to the slaughtering installation.

In order to ensure that the blood runs out of the bird as fully as possible, the bird is positioned such that the location where the cut into the neck is made is located at a lower level than most of the rest of the body of the bird. This is ensured by suspending the poultry from their legs.

In the case of poultry which has been stunned electrically or with the aid of a gas atmosphere, a heart beat, muscle reactions and a pump action are still present in the blood vessels sometime after cutting into the neck, and all these actions promote exsanguination of the slaughter bird.

In the case of stunned birds, but even more so in the case of dead birds (owing to the corporeal functions which are then absent), it is preferred for the blood vessels to be opened as fully as possible. The current state of the art includes various devices which can be used to open the blood vessels in the neck of poultry.

The conveying assembly may e.g. comprise a shackle conveying assembly for carrying birds, suspended by their feet. It is preferred, and also common, that the poultry suspended from the conveying assembly have their breasts facing to one side, such that all poultry has a similar orientation.

Downstream of the slaughtering installation conventionally installations for scalding and defeathering are provided. It is preferred to scald and defeather poultry as soon as possible after the bird has left the slaughtering installation. This is advantageous as defeathered poultry simplifies further processing of the poultry. Secondly, the process of defeathering is easiest when rigor mortis has not yet commenced.

Downstream of the installations for scalding and defeathering an installation for removing the head and trachea with the crop is usually provided. Such an installation removes the trachea and crop, together with the head of the poultry. Adequate removal of the crop and a portion of the trachea without the head, in particular with the trachea being split, is more complicated and thus less efficient. It is beneficial for the connections between the head of the slaughter bird and its body, which are formed in particular by the trachea and the oesophagus, to be intact, so that these connections can be pulled out at the head, and any organs which are joined to them can be pulled out of the body of the slaughter bird. Therefor, it is preferred, but not required, that the head is not removed during the cutting action of the slaughtering installation. In general, the same installation for removing the head and the trachea with the crop is suitable both for removing the head and trachea with crop, and for removing only a portion of the trachea with crop. This removal of only a portion of the trachea with crop costs more time and thus, from this point of view, the amount of poultry without a head and a split trachea should be kept as small as possible.

Subsequent poultry processing commonly involves evisceration, and may involve finally splitting up in fillets, drumsticks etc.

The main killing device according to the invention comprises main poultry positioning means and main cutting means. The poultry positioning means are provided for positioning the neck region of the poultry suspended from the conveying assembly, such that the main cutting means can adequately open at least one blood vessel, preferably all major blood vessels, in the neck region of the poultry.

In an embodiment according to the invention, a blood vessel is opened by moving at least one cutting means into the neck from one side of the neck towards the opposite side of the neck, the at least one blood vessel to be opened being located in the path of the cutting means. The cutting means may be a pin, or a blade or, for example, a water jet. In particular, the cutting means is a substantially elongate blade or a disc-shaped circulating blade which is provided with a sharp, inclined front side, the at least one blood vessel which is to be opened being located in the path of the inclined side of the blade. When an elongate blade is used, this is moved substantially in its longitudinal direction, preferably moved to and fro substantially along a line.

In an advantageous embodiment, the cutting means are provided with a stop member to determine the depth of the cut. In particular, a disc provided parallel and adjacent the cutting blade may be provided as a stop member.

It is preferred that the main cutting means comprise two knives, one for each side of the neck of the poultry, to cut at least the carotid arteries, and possibly also the jugular veins of both sides.

Preferably, the cutting means make a slit at the side of the neck in at least one artery (carotis communis) and at least one vein (vene juglaris), while leaving the trachea and oesophagus intact.

In an embodiment, the main cutting means only has a single knife. When at least three vessels are cut this called a throat cut, severing the trachea and oesophagus. This is used in halal and kosher killing.

As such, the main killing device is suitable for thabiha/dhahiba, which is the prescribed method of ritual slaughter of all animals excluding fish and most sea-life per Islamic law (halal). According to this method, the cutting means are such that a swift, deep incision on the neck is made, cutting the jugular veins and carotid arteries of both sides but leaving the spinal cord intact. Hence, the trachea is split in two, which results in less efficient operation of the installation for removing the head and trachea with the crop. Leaving the vertebra intact means that the head is not yet removed when leaving the slaughtering device according to the invention.

The object of the present invention is to provide an improved slaughtering installation with improved killing rate. An improved slaughtering installation for processing poultry, which installation is adapted to be used in combination with a conveying assembly for conveying poultry which is suspended from their legs in a transport direction T, the slaughtering installation comprising a killing device with poultry positioning means for positioning the neck region of the poultry suspended from the conveying assembly, the killing device further comprising cutting means for cutting into the neck and thereby opening at least one blood vessel in the neck region of the poultry, according to a first aspect of the invention is characterized in that the positioning means comprise a back neck guide along which the back side of the neck of the poultry is guided, and a breast neck guide along which the breast side of the neck of the poultry is guided, both said neck guides extending essentially parallel to the transport direction such that the neck is guided in the plane between the neck guides, wherein the back neck guide is positioned at an elevated position relative to the lower positioned breast neck guide, and wherein the positioning means further comprise a head guide track extending essentially parallel to the transport direction, along which head guide track the lower portion of the head of the suspended poultry, is guided while the poultry is conveyed between the neck guides, such that the bill of the poultry is forced in a direction opposite the transport direction T.

The advantage of the head guide track is that the head guide track forces the head into a twisted position, in which the head is being laid flat on a cheek with the bill extending in a direction opposite transport direction T. In this twisted position, at least the two veins can be cut without cutting into or severing the oesophagus and/or the trachea and/or the vertebra (spine). Advantageously, the twisted position further enables the arteries, which are located relatively far from the surface of the neck, to be reached by the cutting means, to be opened in addition to the jugular veins. Thus, optimum exsanguination of the slaughter bird can be achieved.

It is very much preferred, and also common, that the poultry suspended from the conveying assembly have their breasts facing to one side, such that all poultry has a similar orientation. Alternatively, separate bird orientation means can be provided before the poultry comes into contact with the neck guides. The neck guides are disposed below the conveying assembly. Preferably, the trajectory along which the neck is moved diverges slightly from the transport direction T, away from the side to which the breasts of the poultry are facing. Hence, although the back neck guide and the breast neck guide are positioned parallel to each other, they are allowed to diverge slightly from the transport direction T. If such diversion is in the direction away from the breast of the poultry, as is preferred, while the bird remains suspended from the conveying assembly, such diversion results in stretching of the neck region. This is advantageous for the cutting means to adequately open the at least one blood vessel in the neck region of the poultry.

The upper positioned back neck guide and the lower positioned breast neck guide are positioned such that the head of the suspended poultry is catched and guided between these guides. Hence, preferably the plane between the neck guides perpendicular to the transport direction T includes an angle with respect to the vertical, preferably at an angle of 10-70°, more preferably between 20-50°.

In a preferred embodiment, the back neck guide and the breast neck guide are embodied as two neck guide plates, extending in line with each other, between which the neck is guided.

Alternatively, more conventionally, guide bars may be used. An advantage of plates is that guidance of the poultry is improved.

Once the neck is being guided between the neck guides, the lower end of the head is allowed to come into contact with the head guide track, along which the lower portion of the head is guided. Advantageously, the head guide track converges with 30° to the transport direction T. Hence, the head of the suspended poultry is slightly raised during conveyance. As a result, the neck is allowed to make a slight further twist. This twist is beneficial for the cutting means to open the blood vessels in the neck. In particular, due to the twist, the blood vessels can be reached more easily by the cutting means.

In a possible embodiment, also an upper head guide is provided which extends essentially horizontal and essentially parallel to the conveying direction above the head guide track. The upper head guide is preferably provided at a distance from the position where the heads of the suspended poultry come into contact with the head guide track, but before the position where the head reaches the cutting means. Such an upper head guide may be provided to define the position of the head even more precisely.

In a preferred embodiment, the head guide track comprises retardation means engaging on the head and causing the progress of the head of the poultry to be slowed down compared to the legs of the poultry suspended from the conveying assembly, such that the head of the poultry is forced to twist even further in a direction in which the side of the head is supported by the head guide track and the bill is opposite the transport direction T. Upon such a further twist, the bill may even be raised slightly from the head guide track. The retardation means may include ribs on the head guide track, the ribs extending perpendicular to the transport direction T. Such a further twist is in particular advantageous when two separate cuts are made: one cutting into the neck and a vein and possibly also an artery from above, and a second cut opening the other vein and possibly the other artery from below. The further twisted position is in particular an improved position for this second cut to be able to open the vein (and artery) remaining the trachea, oesophagus and vertebra intact.

In a preferred embodiment, the poultry positioning means comprise a wing guide plate with which the wing comes into contact when entering the killing device, which tilted wing guide plate extends essentially parallel to the transport direction and is tilted about 10-70° from the vertical plane, in the direction of the back of the suspended poultry.

It is both conceivable that separate wing guide plates and neck guide plates according to the invention are provided, and that these plates are physically the same but that their function is dependent on the position seen in transport direction T. Such a wing guide plate improves positioning of the poultry, such that a larger portion of poultry enters the main killing device.

In the killing device according to the first aspect of the invention cutting means for cutting into the neck and thereby opening at least one blood vessel in the neck region of the poultry are provided.

Advantageously, the cutting means comprise two knives, a first knife for cutting into the neck and a vein and possibly also an artery from above, and a second knife to cut into the neck and the other vein and possibly the other artery from below. Preferably, the first knife is positioned upstream from the second knife seen in direction T. As such, the first cutting blade makes an opening in the neck region from above, and subsequently the second knife makes an opening from below.

Preferably, the cutting means comprise one or more knives comprising an essentially vertical cutting blade. Even more preferably, the blade extends at an angle with respect to the vertical, essentially parallel to the plane between the neck guides.

Advantageously rotary cutting blades are provided, having a rotation axis essentially perpendicular to the direction of conveyance T. Preferably, two rotary cutting blades are provided, the first for cutting into the neck and a vein and possibly also an artery from above, and the second knife to cut into the neck and the other vein and possibly the other artery from below.

Although less preferred, the slaughtering installation according to the first aspect of the invention comprises cutting means providing the possibility of opening, i.e. cutting into or severing, into the neck and both the (major) jugular and the deeper carotid arteries by a single movement of the blade, thereby severing the oesophagus and the trachea. Thus, although the head is positioned into a twisted position, allowing a cut without cutting into or severing the oesophagus and/or the trachea and/or the vertebra, a so-called throat cut remains possible with the installation. Such a cut is used in halal an kosher killing, making the slaughtering installation according to the first aspect of the invention also suitable for this type of slaughtering.

According to a preferred embodiment, the poultry positioning means further comprise a back guide downstream (seen in transport direction T) of an entry position S in which the poultry comes into contact with the neck guides, when the neck is positioned between the neck guides. The back guide serves to push the back of the poultry out of the suspended position in a direction perpendicular to the transport direction and perpendicular to the direction of the spinal column. Such a back guide compensates for the different seizes of poultry. As all poultry is suspended by their own weight, the poultry having an increased length is pressed more by the back guide than smaller poultry. In this respect it is noted that the device according to the invention is preferably used for poultry having a weight between 600-5000 grams. Hence, the device is preferably suitable to handle poultry in a large size-range, to which the application of the back-guide advantageously contributes. Advantageously, the back guide comprises an essentially horizontal plate.

According to a second aspect of the present invention, the killing rate is improved by improving the rate of the poultry suspended from the conveying assembly that enters the killing device. This is accomplished in a slaughtering installation for processing poultry, which installation is adapted to be used in combination with a conveying assembly for conveying poultry which is suspended from their legs in a transport direction T, the slaughtering installation comprising a killing device with poultry positioning means for positioning the neck region of the poultry suspended from the conveying assembly, the killing device further comprising cutting means for cutting into the neck and thereby opening at least one blood vessel in the neck region of the poultry, which according to the second aspect of the present invention is characterized in that the poultry positioning means comprise a wing guide plate with which the wing comes into contact when entering the killing device, which tilted wing guide plate extends essentially parallel to the transport direction and is tilted about 10-70° from the vertical plane, in the direction of the back of the suspended poultry. More in particular, the plate is tilted 20-50°. Such a wing guide plate improves positioning of the poultry, such that a larger portion of poultry enters the main killing device. The wing being guided by the wing guide ensures space being created for the head of the suspended poultry.

An additional advantage of the wing guide plate is the reduced amount of wing-damages. The advantage of a plate being used for the wing guide is that friction is reduced.

According to a third aspect of the present invention, an improved conveying assembly is provided. In a slaughtering installation for processing poultry such a conveying assembly may improve the killing rate, by improving the rate of the poultry suspended from a conveying assembly that enters the killing device.

Generally known conveying assemblies comprise an overhead conveyor utilizing shackle assemblies for transporting poultry carcasses through a processing plant. The overhead conveyor includes a track and a series of trolleys hanging therefrom to travel therealong, the trolleys being interconnected by a drive chain, wherein each trolley has a hanger projecting downwardly therefrom. Each shackle assembly comprises a connection member to connect to the hanger, an elongated rod extending essentially vertically from the connection member and a leg-engaging retainer being provided at the lower end of the rod, which may hold the birds either by their hocks or their feet.

In such a conveying assembly the bird suspended from the leg-engaging retainer is allowed to rotate about an essentially vertical axis. As a result, the orientation of the breast of the bird varies. As this is disadvantageous for many operations, conveying assemblies are known that further comprise a guide element disposed generally horizontally below and essentially parallel to the conveying assembly to engage against the leg-engaging retainer. Advantageously, such a guide element also prevents rotation about a horizontal rotation axis extending essentially parallel to the transport direction.

In the known conveying assemblies, the connection member is connected pivotably to hanger and/or the leg-engaging retainer is connected pivotably to elongated rod. As such, rotation about an essentially horizontal rotation axis is allowed. This is advantageous as this allows the overhead conveyor to extend in a non-horizontal direction, while the suspended poultry remains freely suspending in a vertical direction. Hence, the conveying assembly can be positioned at an angle to convey the poultry to an elevated or lower positioned level, while the poultry remains freely suspended.

This rotation about one or both essentially horizontal pivot axes can also be a disadvantage. For example when suspended birds are conveyed into a slaughtering installation, e.g. a slaughtering installation according to one or more of the aspects of the present invention, it is conceivable that the neck or head of a suspended bird gets behind, e.g. due to differences in size of the poultry. Then, the poultry is no longer suspended essentially vertically but is inclined to a certain extent. As the orientation of the suspended poultry is variable, this will complicate many operations, in particular such a precise operation as opening a blood vessel in the neck of the poultry.

According to the present invention, this disadvantage is overcome by providing the conveying assembly further with a guide chain. The guide chain is disposed generally horizontally below and essentially parallel to the conveying assembly, and thus to the guide element. The guide chain is operable synchronously with drive chain, and provided with stops to abut against the leg-engaging retainer to prevent further rotation of the shackle assemblies about an essentially horizontal rotation axis. In particular, rotation about a horizontal rotation axis extending essentially perpendicular to the transport direction is prevented. The stops may e.g. be protruding pins or block-shaped elements, protruding from the guide chain in an essentially horizontal direction perpendicular to the guide chain.

It is in particular advantageous when the guide chain according to the invention is provided below distinct portions of the overhead conveyor where rotation about a horizontal axis is not desired, enabling such rotation below other portions of the overhead conveyor where such rotation is desired. In particular, the guide chain according to the invention is preferably provided between a slaughtering installation according to one or more aspects of the present invention and the overhead conveyor.

According to a fourth aspect of the invention, the improved slaughtering installation is characterized in that the installation comprises a second or back-up killing device. This back-up killing device comprises back-up poultry positioning means and also back-up cutting means for cutting into the neck and thereby opening at least one blood vessel in the neck region of the poultry. This second killing device, which may also be referred to as a back-up killing device, is positioned downstream when seen in direction T from where the conveying assembly enters the main killing device.

Hence, the poultry suspended from the conveying assembly first meets the main killing device at an entry position S in which the poultry should come into contact with the main poultry positioning means. However, some birds suspended from the conveying assembly may not enter the main killing device, e.g. due to the large conveyance speed, differences in size of the poultry or poor/ineffective main poultry positioning means for the poultry. These birds are still suspended from the conveying assembly, and are conveyed in the direction T, in a path generally adjacent the main killing device.

According to the invention, the portion of the poultry suspended from the conveying assembly which has not entered the main killing device comes at a back-up position B into contact with the back-up positioning means, and is conveyed in direction T past the back-up cutting means of the back-up killing device until the exit position E in which the killed poultry exits the slaughtering installation. Thus, the poultry suspended from the conveying assembly either enters the main killing device at entry position S or is conveyed further adjacent the main killing device to come into contact with the back-up poultry positioning means at back-up position B.

Preferably, the back-up killing device is provided essentially parallel to and adjacent the main killing device, and essentially parallel to the direction of conveyance T. Small deviations from a sheer parallel orientation may even be beneficial for the back-up killing device to be able to fetch the neck region of poultry that has not entered the main killing device, as will be elucidated with respect to the drawings.

According to a preferred embodiment, the main cutting means and the back-up cutting means are positioned substantially at the same distance (seen in the direction of conveyance T) from exit position E of the slaughtering installation such that both poultry killed by the main killing device and poultry killed by the back-up killing device exit the slaughtering installation at exit position E.

As a bird that has not entered the main killing device is killed in the back-up killing device, it is assured that all poultry suspended from the conveying assembly has been killed when leaving the slaughtering installation at the exit position E.

Preferably, the back-up poultry position means comprise one or more neck guides along which or between which the neck of the suspended poultry is guided until the neck reaches or passes the back-up cutting means.

In a preferred embodiment, the back-up killing device operates at more efficiently than the main killing device. Thus, although in principle it is not preferred to remove the head in a killing device, from an efficiency viewpoint, a preferred back-up killing device removes the head during the cutting action. Such process is also referred to a decapitation. Hence, preferably the neck of the poultry is guided by the neck guides along the cutting means, causing the poultry to be killed and its head to be removed.

The cutting means may comprise two straight knives each having an essentially horizontal blade which is essentially parallel to the direction of conveyance T, along which knife the neck is guided.

Alternatively, the cutting means may comprise one or two essentially horizontal rotary blades, having a rotation axis essentially perpendicular to the direction of conveyance T. Preferably, the rotary blades are driven by a drive motor.

It is preferred that the back-up killing device is positioned between the entry position S and a position in which the killed poultry leaves the main killing device. As such, the portion of poultry that has not entered the main killing device can clearly be distinguished from the poultry in the main killing device, and this portion is allowed to enter the back-up killing device according to the invention, at the same time as the main portion of the suspended poultry is in the main killing device.

The present invention also relates to a method for slaughtering poultry in a slaughtering installation comprising a main killing device with main poultry positioning means for positioning the neck region of the poultry suspended from the conveying assembly, the main killing device further comprising main cutting means for cutting into the neck and thereby opening at least one blood vessel in the neck region of the poultry, the slaughtering installation further comprising a back-up killing device comprising back-up poultry positioning means and back-up cutting means for cutting into the neck and thereby opening at least one blood vessel in the neck region of the poultry, the method comprising the following steps:

transporting the suspended poultry in a transport direction T;

a first portion of the poultry entering the main killing device at an entry position S;

the poultry coming into contact with the main poultry positioning means;

the remaining poultry which has not entered the main killing device coming into contact with the second positioning means at a back-up position B, downstream in direction T from the entry position S;

further conveying the first portion of the poultry in direction T past the main cutting means;

opening at least one blood vessel of the first portion of the poultry;

further conveying the remaining poultry in direction T past the back-up cutting means;

opening at least one blood vessel of the remaining poultry;

the first portion and remaining poultry leaving the slaughtering installation at a common exit position E.

It will be clear that the various aspects of the invention can be realized separately and/or in all possible combinations.

The preferred embodiment of the invention as shown in the drawings has the advantages that it is simple, easy to maintain and robust to operate. In the drawings:

FIG. 5a shows the slaughtering installation as shown in FIG. 3 in more detail at stage B;

FIG. 5b shows the slaughtering installation as shown in FIG. 3 in cross section at stage B;

Figure 1:
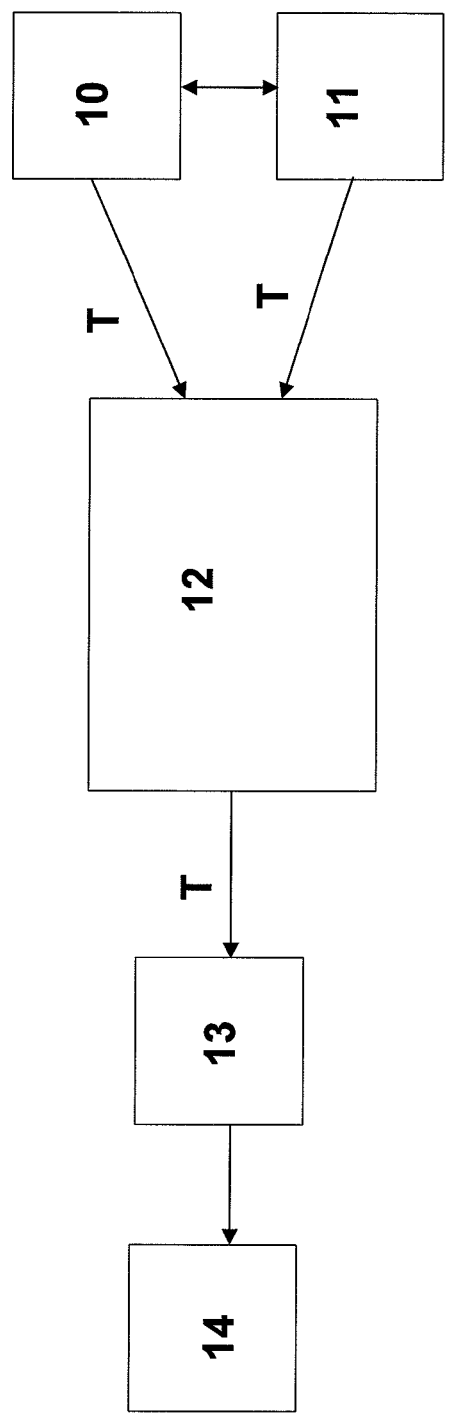
FIG. 1 shows schematically a portion of the flow chart for processing poultry.

In FIG. 1 schematically a portion of the flow chart for processing poultry is shown. The schematical drawing indicates parts of an installation for processing poultry, relevant for a slaughtering installation according to the present invention. In station 10, poultry is being stunned. This may take place either electrically or by gas. In station 11, the poultry is hung by its legs in a conveying assembly. Generally, this takes place manually. It is both possible to first stun and then hang the poultry, or to first hang the poultry and subsequently stun the birds. In any event, the conveying assembly from which the poultry is suspended conveys the poultry in a transport direction T to a slaughtering installation 12 according to the present invention.

The poultry has thus been stunned in station 10, and subsequently transported in succession to the slaughtering installation 12. This installation 12 is adapted to be used in combination with a conveying assembly for conveying poultry which is suspended from their legs in a transport direction T, e.g. an overhead conveyor with a rail and shackles.

Subsequent to the slaughtering installation 12 an installation for scalding 13 is provided. Scalding may take place in a bath or by steam or humid hot air or any alternative medium.

Subsequently, the poultry is conveyed to an installation for defeathering 14.

Figure 2:
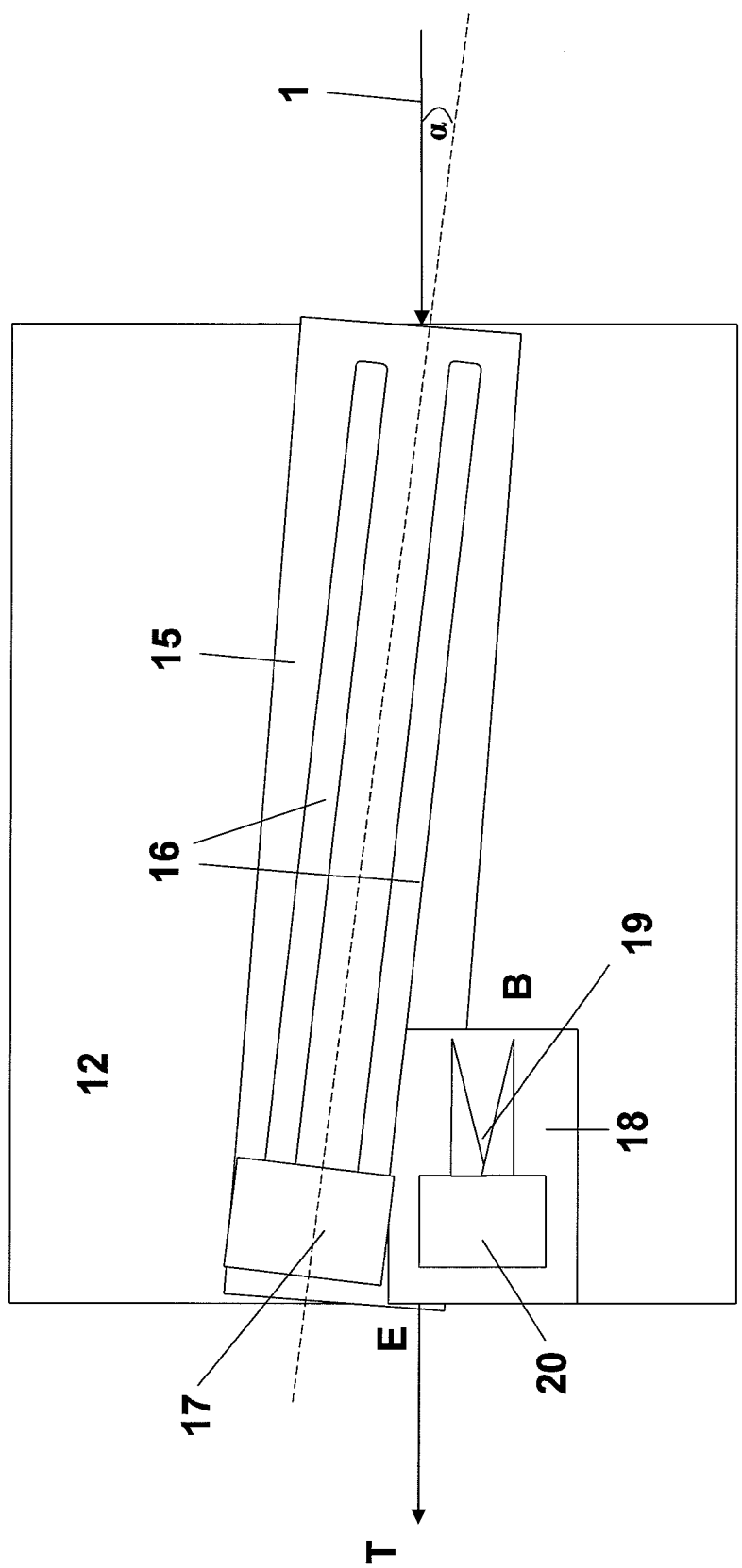
FIG. 2 shows the slaughtering installation according to the fourth aspect of the invention schematically.

In FIG. 2, an embodiment of the slaughtering installation 12 according to the fourth aspect of the invention is shown schematically. The slaughtering installation 12 comprises a main killing device 15 with main poultry positioning means 16 for positioning the neck region of the poultry suspended from the conveying assembly. The main killing device 15 further comprises main cutting means 17 for opening at least one blood vessel in the neck region of the poultry. Poultry suspended from the conveying assembly follow a path 1 and enter the main killing device 15 at an entry position S in which the poultry comes into contact with the main poultry positioning means 16, and is conveyed along path 1 in direction T past the main cutting means 17 until it reaches an exit position E in which the killed poultry exits the slaughtering installation 12.

According to the fourth aspect of the present invention, the slaughtering installation 12 further comprises a back-up killing device 18. The back-up killing device 18 comprises back-up poultry positioning means 19 and back-up cutting means 20 for opening the at least one blood vessel in the neck region of the poultry.

In principle, ideally the main killing device and the back-up killing device are both aligned parallel to the direction of conveyance. However, if the back-up killing device is to be positioned adjacent the main killing device, which is according to a preferred embodiment of the invention, space is preferably made available. As shown in the embodiment in FIG. 2, the back-up killing device 18 is positioned downstream in direction T from the entry position S, adjacent the main killing device 15, and essentially parallel to the direction of conveyance T. Space for the back-up killing device is here created by positioning the main killing device at an angle $\alpha$ with respect to the direction of conveyance T, e.g. between 5-15°. Hence, in the shown embodiment, the back-up killing device is also positioned at a small angle with the main killing device 15. This is in particular beneficial as poultry which has not entered the main killing device is conveyed further in direction T, and as such automatically enters the back-up killing device. Poultry which has entered the main killing device is also conveyed further in direction T, but in this case the position of the poultry is allowed to be manipulated slightly: while the feet suspended in the conveying assembly proceed in direction T, the neck and head of the poultry proceed in the direction of the main killing device. Thus, the poultry suspended from the conveying assembly either enters the main killing device at entry position S or is conveyed further adjacent the main killing device 15 to come into contact with the back-up poultry positioning means 19 at back-up position B.

Alternatively, it is conceivable that the back-up killing device 18 includes an angle with the transport direction T, or that both the main and the back-up killing device include an opposite angle with the transport direction T.

In the embodiment shown in FIG. 2, the main cutting means 17 and the back-up cutting means 20 are positioned substantially at the same distance from exit position E. All poultry leaves the slaughtering installation 12 at exit position E. Exit position E is in the shown embodiment adjacent the main killing device, hence, poultry leaving the main killing device immediately exit the slaughtering installation. The back-up killing device 18 is positioned between the entry position S and exit position E in which the killed poultry leaves the main killing device. Also poultry leaving the back-up killing device immediately exits the slaughtering installation at exit position E.

In the embodiment shown in FIG. 2, the back-up poultry positioning means 19 are embodied relatively simple. Back-up cutting means 20 are not shown in detail, but are according to a preferred embodiment of the invention embodied as decapitation means, removing the entire head of the poultry. This ensures a fast and efficient back-up killing device 18, which is advantageous from a viewpoint of overall efficiency.

Figure 3:
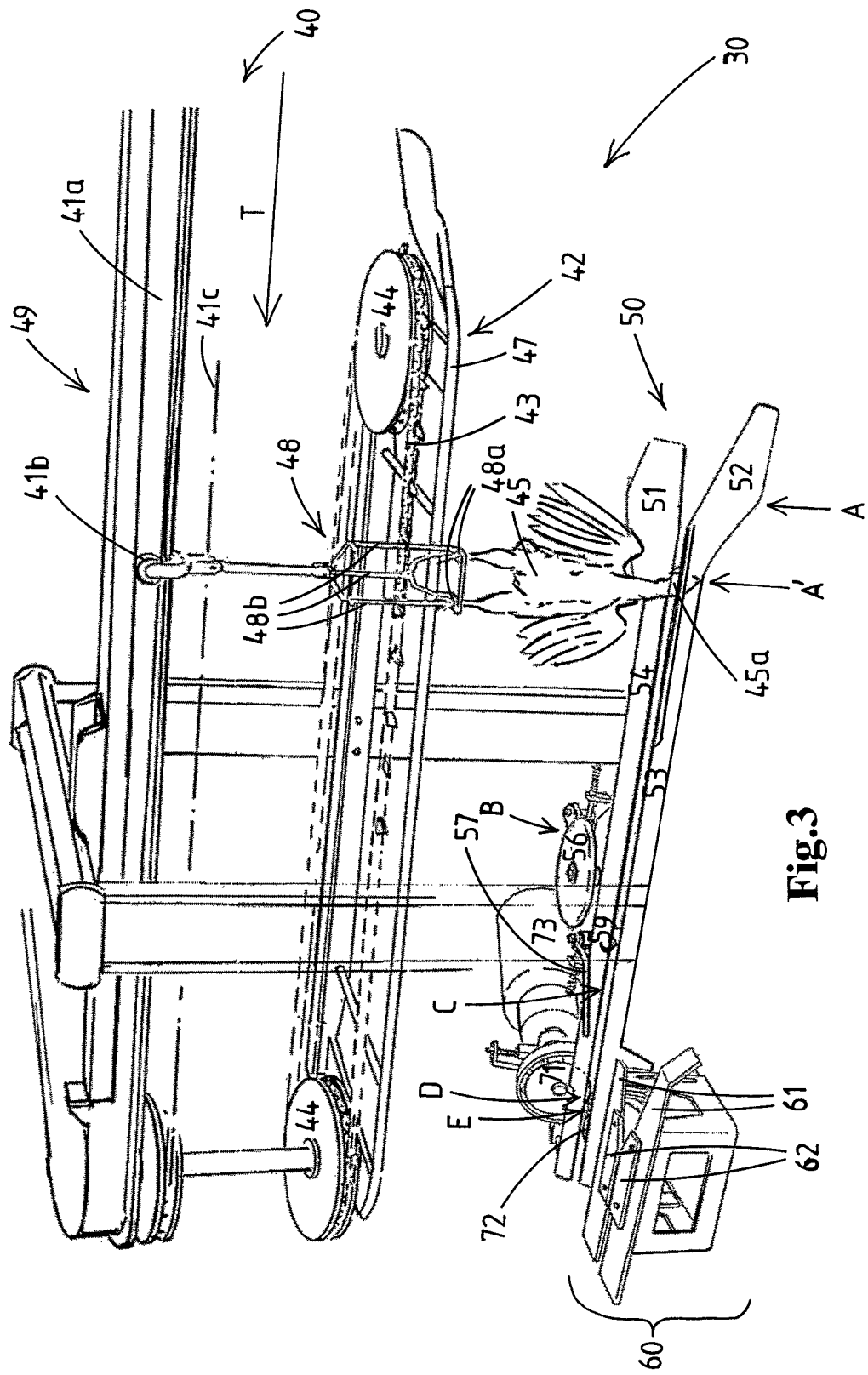
FIG. 3 shows an exemplary slaughtering installation for processing poultry according to the invention.

In FIG. 3 an exemplary slaughtering installation for processing poultry according to the invention is shown. The installation is generally indicated with reference number 30. The slaughtering installation 30 is adapted to be used in combination with a conveying assembly 40. The conveying assembly 40 conveys poultry suspended from their legs in succession in direction T.

In FIGS. 4-8 portions of the slaughtering installation 30 as shown in FIG. 3 are shown in more detail in an exploded view, in which the poultry is at subsequent stages indicated in capitals A, A', B, C, D, E of the slaughtering installation 30. 'Subsequent' stages are defined as subsequent as seen in transport direction T. FIGS. 4a, 5a, 6a, 7a and 8a show portions of the slaughtering installation 30 in a perspective view. FIGS. 4b, 5b, 6b, 7b and 8b show cross sections of the slaughtering installation 30 at these stages A', B, C, D and E, in which the position of the suspended poultry is included in this cross section.

The conveying assembly 40 as shown comprises a single overhead conveyor 49. Alternatively, the conveying assembly may be composed of multiple conveyors connectable via overhanging systems. In a hanging installation (not shown), each bird 45 is suspended from his legs 45c in a shackle assembly 48. The overhead conveyor 49 includes a track 41a and a series of trolleys 41b hanging therefrom to travel therealong. The trolleys 41b are interconnected by a drive chain 41c (only schematically indicated). The shackle assembly 48 is being suspended from overhead conveyor 49 and guided along the conveyor via trolleys 41b. The shown shackle assembly 48 comprises two recesses 48a in which the legs 45c of the bird 45 fit.

The poultry suspended from the conveying assembly 40 all have their breasts 45d facing to the same side, such that all poultry has a similar orientation. It is conceivable that separate bird orientation means are provided to orient the poultry.

The conveying assembly 40 further comprises a guide element 47 disposed generally horizontally below and essentially parallel to the overhead conveyor 49 to engage against the shackle assembly 48 to prevent rotation about an essentially vertical axis.

The conveying assembly 40 further comprises an endless guide chain 43 disposed generally horizontally below and essentially parallel to the overhead conveyor 49 and the guide element 47. The guide chain 43 is an endless chain, guided by wheels 44. The guide chain 232 is operable synchronously with drive chain 206.

According to the third aspect of the invention, the guide chain 43 is provided with stops to prevent rotation of the shackle assemblies about an essentially horizontal rotation axis. This forced transportation of the shackle assembly 48 according to the third aspect of the invention is advantageously combined with a slaughtering installation according to one or more other aspects of the invention. Such a preferred conveying assembly is shown in detail in FIG. 11, and explained in detail in the description accompanying FIGS. 11 and 12.

Slaughtering installation 30 comprises a main killing device 50 and a back-up killing device 60. Back-up killing device 60 is positioned essentially parallel to the main killing device 50 and transport direction T. It is conceivable, but not a prerequisite, that the trajectory along which the poultry travels through the main killing device 50 diverges a little from the transport direction T, such that suspended poultry not having entered the main killing device 50 continues in transport direction T to enter the back-up killing device 60. Such a setup is not visible in FIG. 3, but is indicated in the schematic drawing in FIG. 2.

Back-up killing device 60 comprises back-up poultry positioning means 61, here embodied as two essentially horizontally extending converging plates between which the neck of the suspended poultry is guided towards back-up cutting means 62. In the shown embodiment, the back-up cutting means 62 comprise two essentially horizontally extending knife blades, between which the neck of the suspended poultry is brought via the positioning means 61. The back-up cutting means 62 as shown decapitate the poultry: the entire head is removed, during which action the two veins, two arteries, oesophagus, trachea and vertebra are split.

Main killing device 50 comprises main poultry positioning means for positioning the neck region 45a of the poultry 45 suspended from the conveying assembly 40.

Figure 4B:
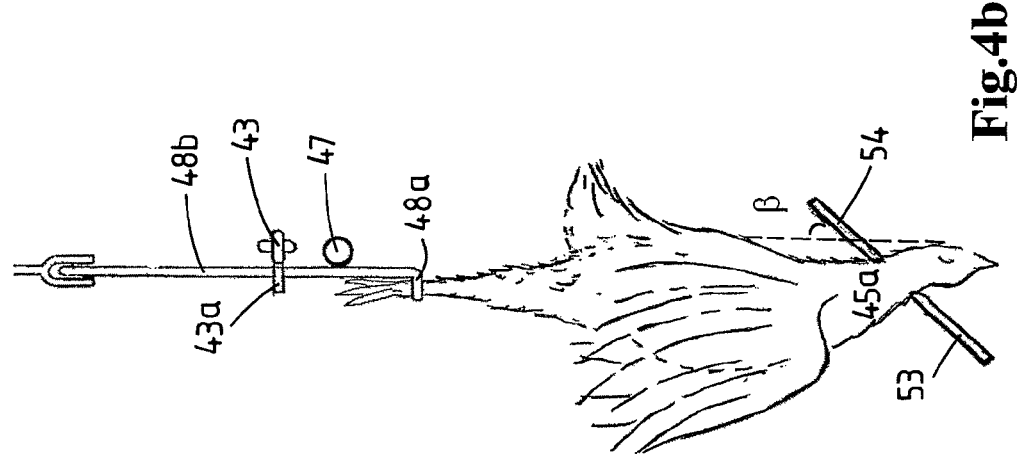
FIG. 4b shows the slaughtering installation as shown in FIG. 3 in cross section at stage A'.
Figure 4A:
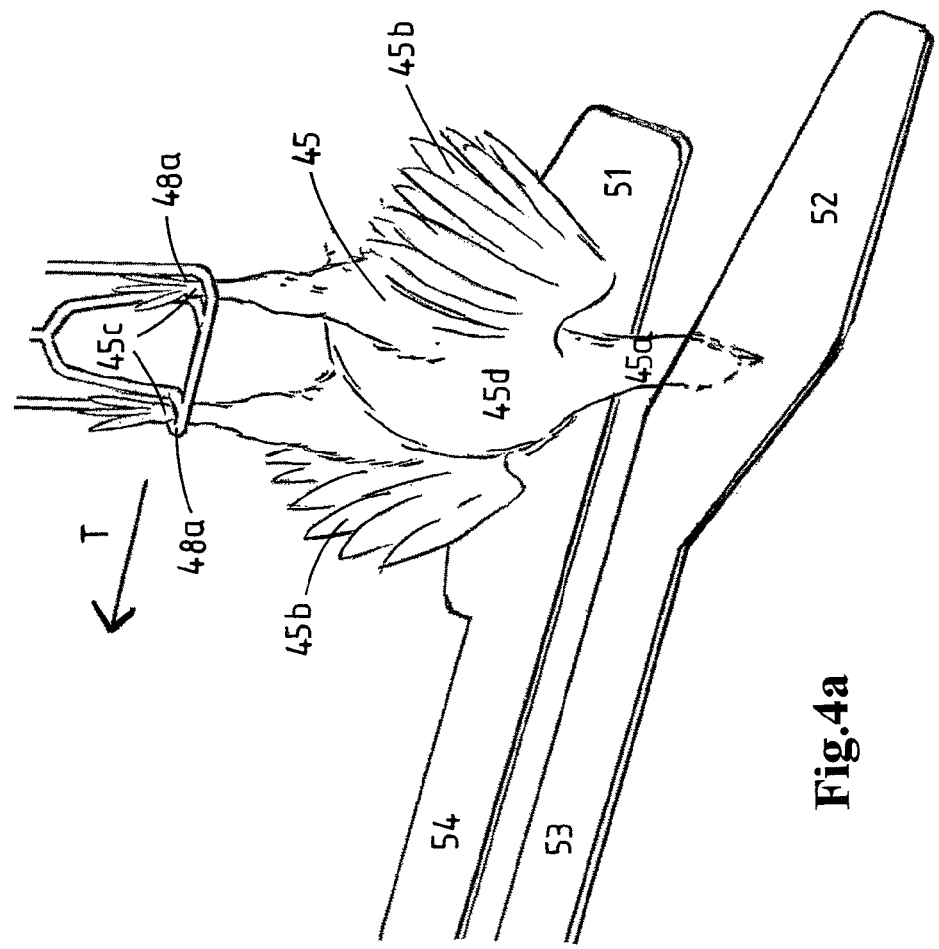
FIG. 4a shows the slaughtering installation as shown in FIG. 3 in more detail at stage A.
Figure 6B:
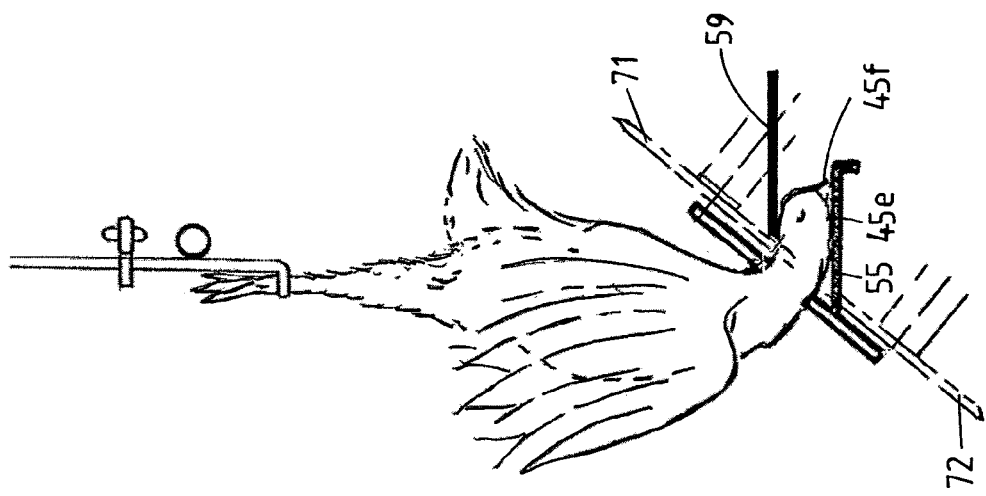
FIG. 6b shows the slaughtering installation as shown in FIG. 3 in cross section at stage C.
Figure 6A:
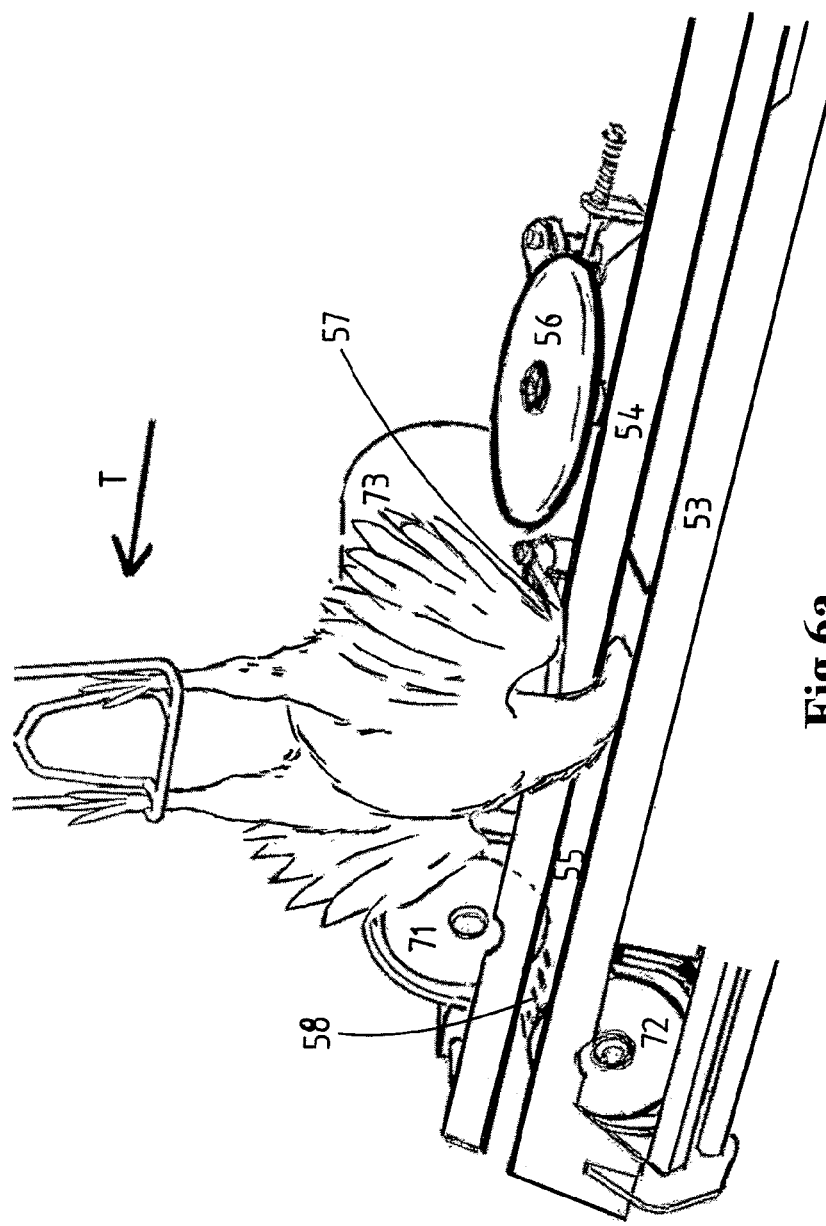
FIG. 6a shows the slaughtering installation as shown in FIG. 3 in more detail at stage C.
Figure 7B:
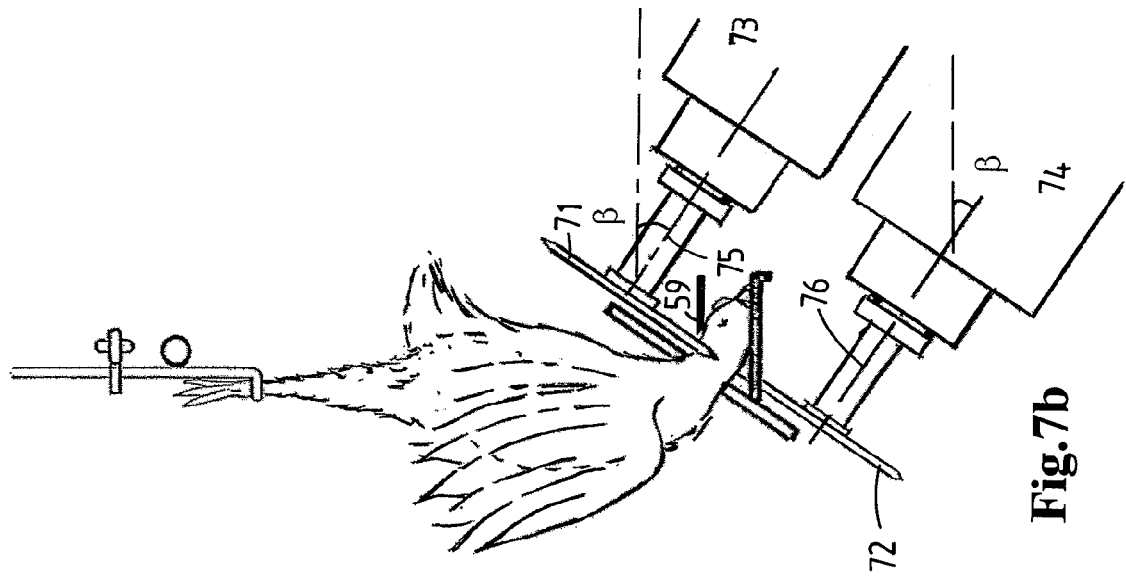
FIG. 7b shows the slaughtering installation as shown in FIG. 3 in cross section at stage D.
Figure 7A:
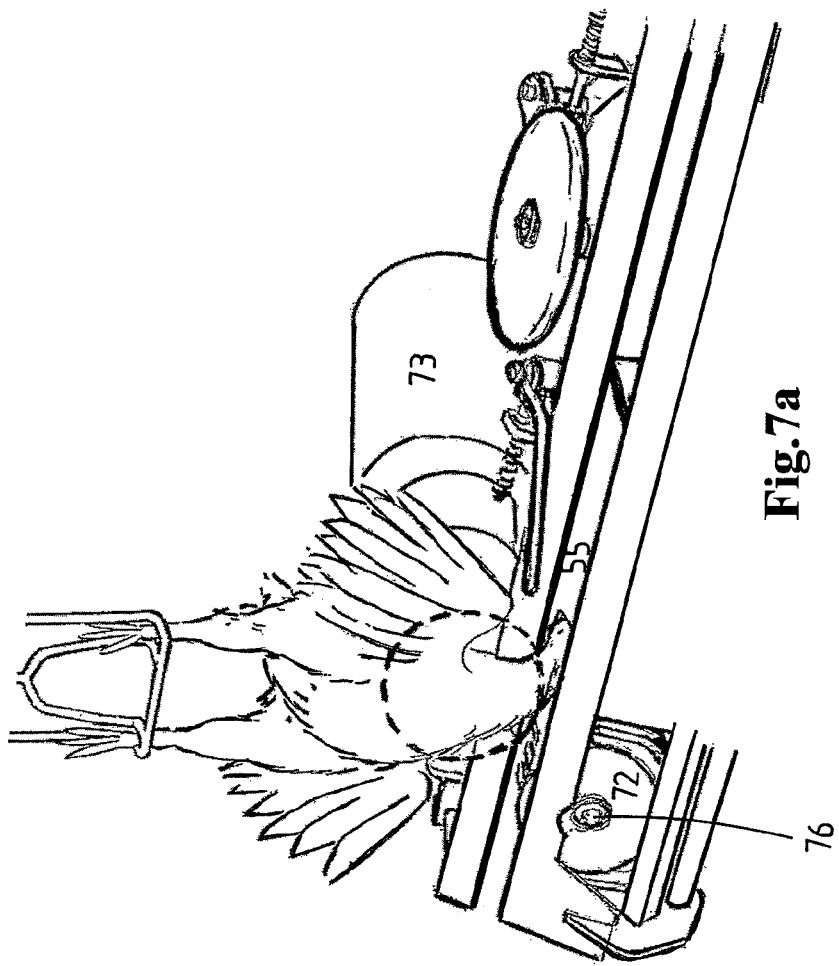
FIG. 7a shows the slaughtering installation as shown in FIG. 3 in more detail at stage D.
Figure 8B:
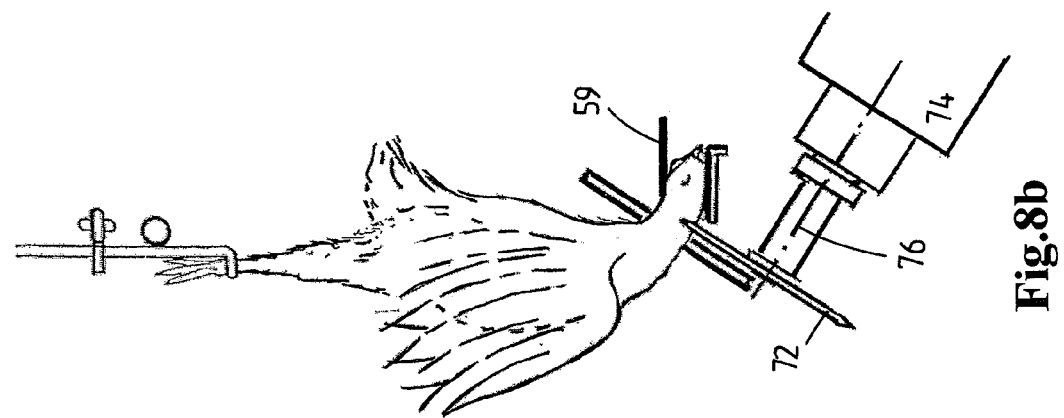
FIG. 8b shows the slaughtering installation as shown in FIG. 3 in cross section at stage E.
Figure 8A:
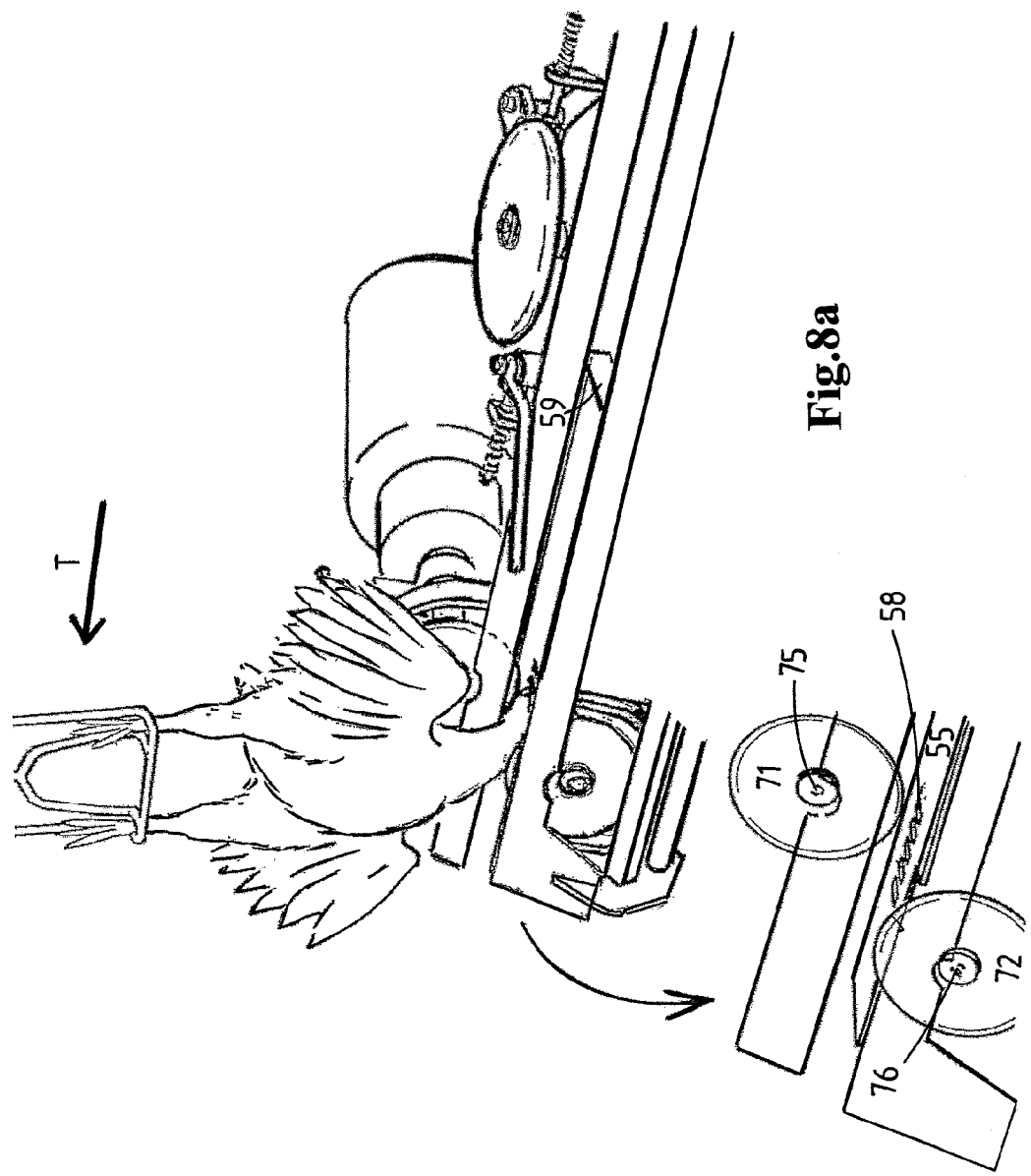
FIG. 8a shows the slaughtering installation as shown in FIG. 3 in more detail at stage E.

The main poultry positioning means in the shown embodiment comprise a wing guide plate 51, shown in an enlarged view in FIG. 4a. Suspended poultry entering the main killing device 50 have their breast 45d facing in a specified direction. Hence, the back of the wings 45b face the opposite direction. Wing guide plate 51 is positioned parallel to the transport direction T, such that the back of the poultry with the wings 45b comes into contact with the wing guide plate. In particular, the lower edge of the wing guide plate 51 contacts the neck area of the bird, while the upper side of the wing guide plate is adjacent the back of the bird. The wing guide plate 51 is preferably tilted about 10-70° with respect to the vertical, more preferably about 20-45°, such that the wing guide plate 51 substantially follows the natural position of the back of suspending poultry, and thus that the suspended bird is not yet forced in an unnatural position by the wing guide plate 51. Of course, as the dimensions of suspended poultry vary, it is inevitable that the wing guide plate displaces many of the birds slightly from their 'natural' hanging position. An advantage of the wing guide plate is the reduced amount of wing-damages, as friction during entry of the slaughtering installation is reduced.

Opposite the wing guide plate 51 the main poultry positioning means of the shown embodiment comprise a breast neck positioning plate 52 which attributes to the positioning of the poultry, in particular, the neck of the poultry at the breast side of the bird is allowed to come into contact with the breast neck positioning plate 52, which plate diverges in the direction of the wing guide plate 51 and thus contributes to reproducible positioning of the suspended poultry.

The main poultry positioning means of the slaughtering installation 30 further comprise neck guides, in particular a back neck guide 54 along which the back side of the neck of the poultry is guided an a breast neck guide 53 along which the breast side of the neck of the poultry is guided. In the shown embodiment, the wing guide plate 51 transfers into the back neck guide 54, and the breast neck positioning plate 52 transfers into the breast neck guide 53. The neck guides 53, 54 are disposed below the conveying assembly 40.

Back neck guide 54 and breast neck guide 53 extend essentially parallel to each other and to the transport direction T, such that the neck of the suspended poultry is guided by the neck guides and the neck moves in the plane between the neck guides. Preferably, the trajectory along which the neck is moved diverges slightly from the transport direction T, away from the side to which the breasts of the poultry are facing, such that the neck region is being stretched.

As is visible in FIG. 4b showing the poultry in position A' in cross section, the back neck guide 54 is positioned at an elevated position relative to the lower positioned breast neck guide 53. Both the back neck guide 54 and the breast neck guide 53 are embodied as neck guide plates, extending in line with each other, between which the neck is guided. The upper positioned back neck guide and the lower positioned breast neck guide are positioned such that the neck of the suspended poultry is catched and guided between these guides, again without disturbing the 'natural' position of a hanging bird too much. In the shown embodiment, the plane between the neck guides perpendicular to the transport direction T includes an angle β with respect to the vertical, preferably an angle β of 10-70°, more preferably between 20-50°.

In FIGS. 5b, 6b, 7b and 8b a head guide track 55 is visible which is also part of the main positioning means. The head guide track 55 extends essentially horizontally parallel to the transport direction T and commences between position A' and B in FIG. 3, hence, after the neck of the poultry has come into contact with the neck guides 53, 54 and before the back of the bird comes into contact with back guide 56, further explained below. Preferably, but not visible in the drawing, the head guide track diverges slightly upwards from the horizontal plane such that the head of the bird is guided in an upward direction. The angle of divergence may e.g. be 20-40°.

The lower portion of the head of the suspended poultry, in particular a cheek 45e and the bill 45f of the bird, are guided by the head guide track 55 while the poultry is being conveyed, such that the bill 45f of the poultry is forced in a direction opposite the conveyance direction T. As such, the head guide track 55 thus forces the head into a twisted position, deviating from the 'natural' hanging position.

The shown main positioning means of the main killing device 50 further comprises two back guides 56, 57. These back guides 56, 57 push against the back of the suspended poultry, while the neck of the suspended bird is being guided between the neck guides 53, 54. As a result, the neck area of the bird is being stretched, contributing to the reachability of the veins and arteries in the neck region of the suspended poultry. This is shown in FIG. 5b. The back guide 56 is a blunt rotatable disc, which is resiliently mounted. As a result of the resiliency, the back is pressed more outwards when the bird is large, and less when the bird is relatively small. Back guide 57 is a resiliently mounted rod, which operates in a similar way. These back guides thus contribute to the accurate positioning of the neck area of the suspended poultry, and contribute to the ability of the slaughtering installation to slaughter poultry in a certain size range.

The positioning means of the main killing device 50 further comprise an upper head guide 59. This upper head guide 59 extends essentially parallel to the conveying direction, above the head guide track 55. In FIGS. 3, 5a, 6a, 7a and 8a the start of this upper head guide is visible, between back guides 56, 57 seen in transport direction T. To be able to see the head guide track 55, this upper head guide 59 is not further indicated, as it completely covers the head guide track 55.

Figure 9:
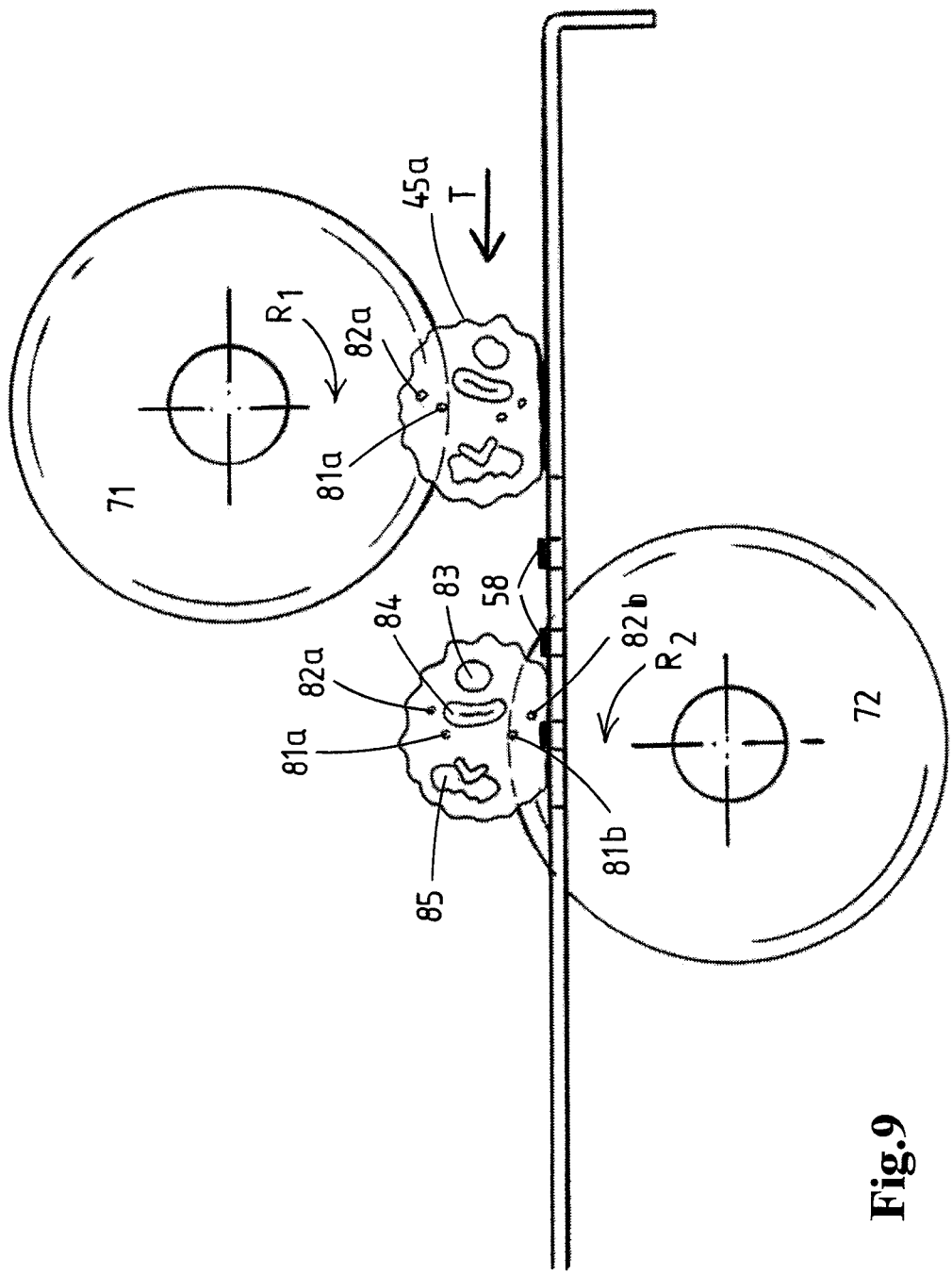
FIG. 9 shows the slaughtering installation as shown in FIG. 3 in more detail at stages D and E.

Thus, in the shown embodiment the poultry positioning means comprise neck guide plates 53, 54, back guides 56, 57, upper head guide 59 and head guide track 55. These poultry positioning means position the neck region of the poultry suspended from the conveying assembly in a twisted position. In this twisted position, clearly visible in FIG. 6b, the cheek 45e lays on the head guide track 55 with the bill 45f extending opposite the conveyance direction. When the head of the poultry has been twisted like this, the neck area has also been twisted and as a result, the vein and artery at one side of the neck area are easier to be reached by cutting means. In particular, the vein and neck of the bird at the side of the neck which enters the slaughtering installation first are as a result of this twist relatively 'superficial' and more easy to be reached by cutting means. This is shown in FIG. 9, in which a cross section of the neck area 45a is indicated: arteries (carotis communis) are numbered 81a and 81b, the veins (vene juglaris) 82a and 82b, the trachea with reference number 83, the oesophagus with number 84 and the vertebra with number 85. From FIG. 9, it is visible that with the twist it is possible to cut artery 81a and vein 82a without severing the trachea 83, oesophagus 84 or vertebra 85.

The shown head guide track 55 comprises retardation means 58 downstream of main cutting means 71, further explained below. These retardation means 58, embodied as ribs on the head guide track 55 extending perpendicular to the transport direction T, decelerate the movement of the head relative to the conveyance speed, and as such initiate a further twist. As a result of this twist, the vein 82b and artery 81b on the other side of the neck are easier to be reached by cutting means, as is illustrated in FIG. 9. With this further twist, the bill is raised slightly from the head guide track 55.

In a preferred embodiment (not shown), the neck guide plates 53, 54 are provided with protrusions and/or indentations which contribute to the twisting of the head of the poultry. As such, the twisted position can be fine-tuned until an optimum orientation of the blood vessels is achieved.

The killing device 50 comprises two cutting means 71, 72 for opening the blood vessels in the neck region of the poultry. In particular, main cutting means 71 are positioned such that the vein and artery at one side of the neck region may be cut from above, while the back-up cutting means 72 are provided at a subsequent position, seen in the transport direction T, to cut the vein and artery at the opposite side of the neck region from below. Both first and back-up cutting means 71, 72 are embodied as rotary cutting blades, having a rotation axis 75, 76 respectively, essentially perpendicular to the direction of conveyance T. The cutting means 71, 72 comprise drive means 73, 74 respectively. As is visible in FIGS. 6b, 7b and 8b the rotation axes 75, 76 of this embodiment do not extend horizontally but at an angle β with the horizontal. This angle β corresponds to the angle between the neck guide plates 53, 54 with the vertical, as the cutting blades in the shown embodiment extend parallel to the neck guide plates 53, 54.

As is advantageous for the invention, the first rotary cutting blade 71 rotates in direction R1, to twist the head of the poultry even further. This is beneficial for the second rotary cutting blade 72 to perform an additional cut of the vein and artery at the other side of the neck, which second cutting blade 72 rotates in direction opposite R2 to give an even further twist to the head of the poultry.

It is preferred, but not shown, that the first cutting blade 71 has a rotary guide blade parallel and adjacent to the cutting blade to determine the depth of the cut. When this guide blade is provided with a straight edge this may contribute to the further twist of the head. Preferably, also the second cutting blade 72 is provided with a rotary guide blade parallel and adjacent to the cutting blade 72 to maximize the depth of the cut.

Figure 10:
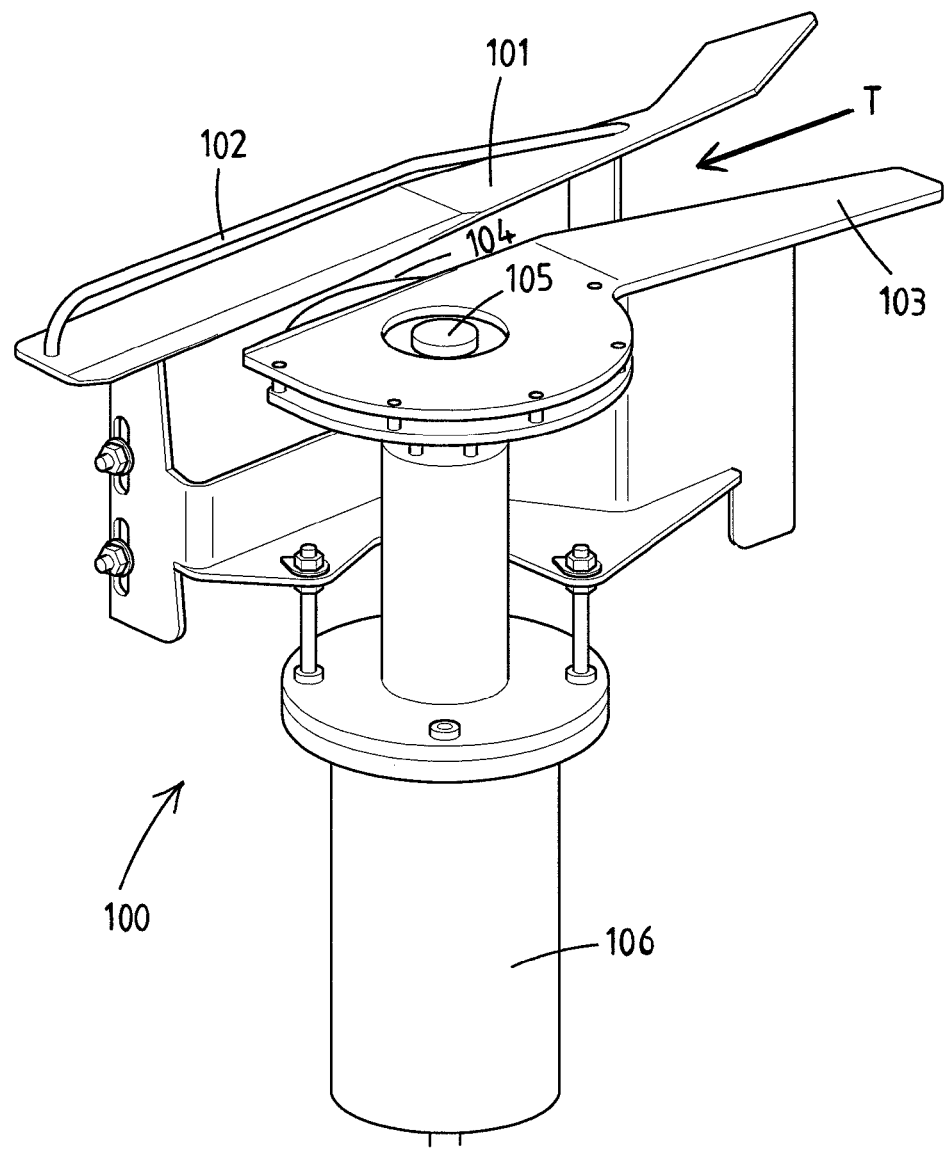
FIG. 10 shows an alternative embodiment of a back-up killing device according to the invention.

FIG. 10 shows an alternative embodiment of a back-up killing device 100 according to the invention. The back-up killing device 100 comprises back-up poultry positioning means 101, 102, 103 and back-up cutting means 104 for opening the at least one blood vessel in the neck region of the poultry. According to the invention, the back-up killing device 100 is positioned essentially parallel to the main killing device and transport direction T. Suspended poultry which has not entered the main killing device is allowed to enter the back-up killing device in transport direction T. The back-up poultry positioning means are here embodied as two essentially horizontally extending converging plates 101, 103 between which the neck of the suspended poultry is guided towards back-up cutting means 104. A guidance bar 102 is provided parallel to plate 101. In the shown embodiment, the back-up cutting means 104 comprise a single rotating essentially horizontally extending knife blade, along which the neck of the suspended poultry is brought via the positioning means 101, 103. The back-up cutting means 104 as shown decapitate the poultry: the entire head is removed, during which action the two veins, two arteries, oesophagus, trachea and vertebra are split. The rotating knife blade 104 is rotatable about rotation axis 105, and driven by a motor 106.

Figure 11:
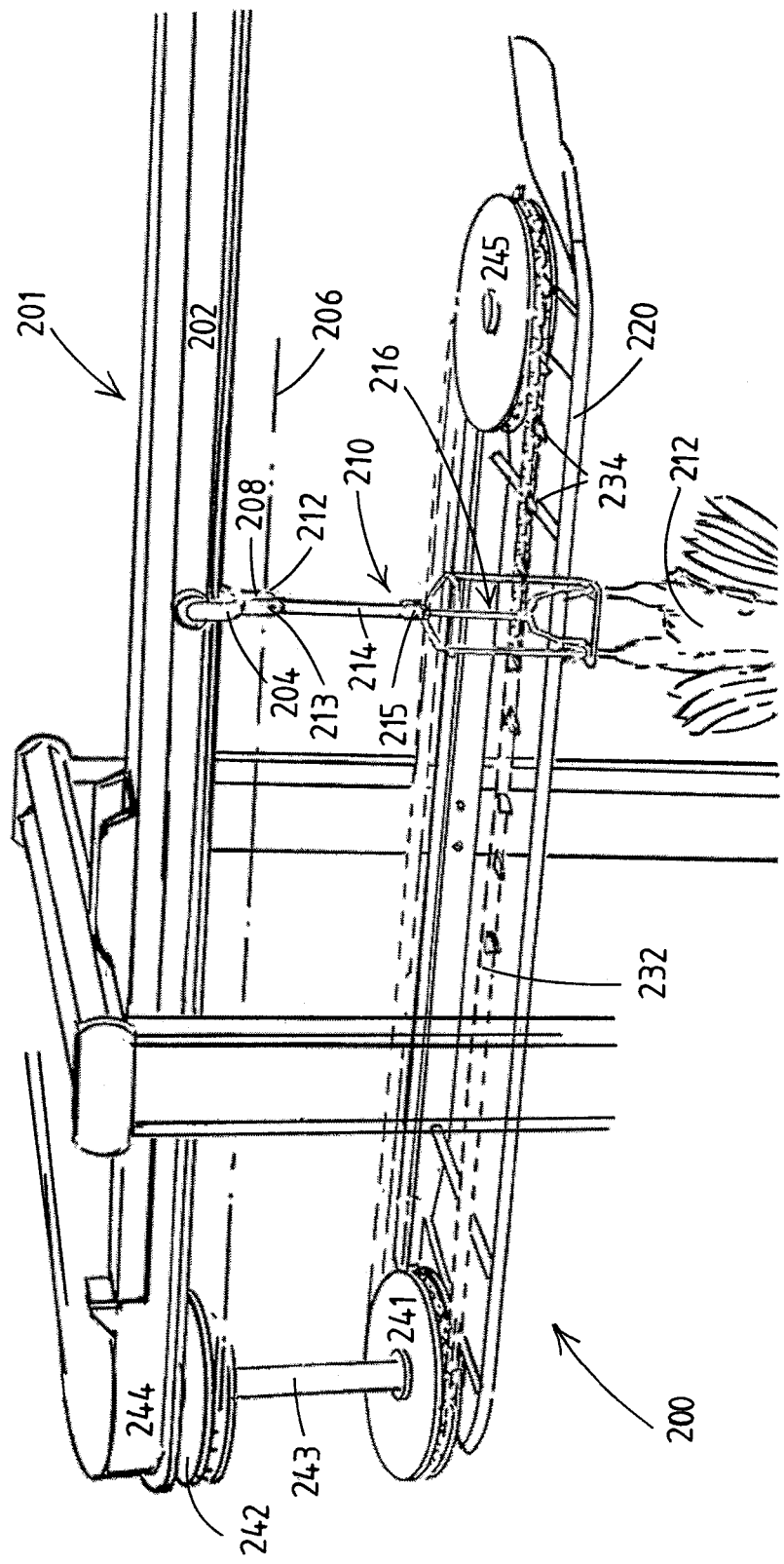
FIG. 11 shows an embodiment of a conveying assembly according to the third aspect of the invention.
Figure 12:
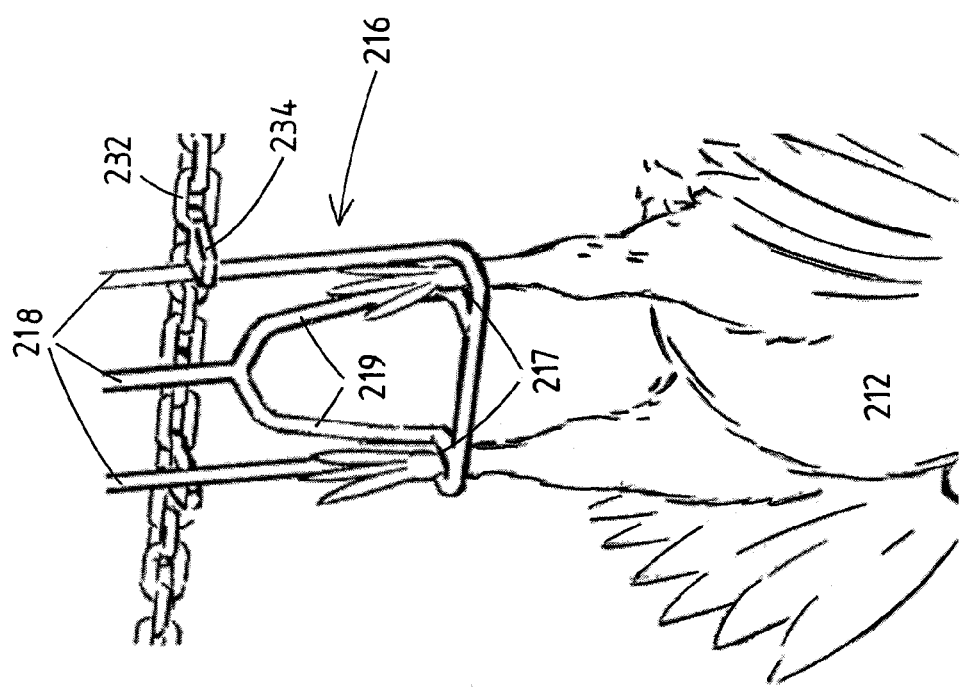
FIG. 12 shows a portion of the embodiment of a conveying assembly of FIG. 11 in detail.

In FIG. 11 a conveying assembly 200 according to the third aspect of the invention is shown. The conveying assembly 200 comprises an overhead conveyor 201 utilizing shackle assemblies 210 for transporting poultry carcasses 212 through a processing plant.

The overhead conveyor 201 includes a track 202 and a series of trolleys 204 hanging therefrom to travel therealong. The trolleys 204 are interconnected by a drive chain 206, wherein each trolley 204 has a hanger 208 projecting downwardly therefrom.

Each shackle assembly 210 comprises a connection member 212 to connect to the hanger 208 and an elongated rod 214 extending essentially vertically from the connection member. In the shown embodiment, the connection member 212 and the elongated rod 214 are embodied as a single piece, which is connected to the hanger 208 such that rotation about horizontal rotation axis 213 is allowed.

Shackle assembly 210 further comprises and a leg-engaging retainer 216 at the lower end of the rod 214. The leg-engaging retainer 216 is connected pivotably to the elongated rod 214, such that rotation about horizontal rotation axis 215 is allowed. The leg-engaging retainer 216 is shown in an enlarged view in FIG. 12. In particular, leg-receiving openings 217 are visible, and essentially vertically extending frame bars 218, 219.

The conveying assembly 200 further comprises a guide element 220 disposed generally horizontally below and essentially parallel to the overhead conveyor 201 to engage against the leg-engaging retainer 216 to prevent rotation of the shackle assemblies 210 about an essentially vertical axis.

The conveying assembly 200 further comprises an endless guide chain 232 disposed generally horizontally below and essentially parallel to the overhead conveyor 201 and the guide element 220.

In the embodiment shown in FIG. 11, the guide chain 232 is not provided below the entire overhead conveyor 201, but only below a portion of the overhead conveyor, in which trajectory rotation about a horizontal rotation axis is not desired. the guide chain 232 is an endless chain, guided by wheels 241 and 245.

The guide chain 232 is operable synchronously with drive chain 206. In the embodiment shown in FIG. 11 both chains 232, 206 are guided by wheels 241, 242 respectively, which wheels are connected via a connection rod 243 and driven simultaneously by a motor unit 244.

According to the invention, the guide chain 232 is provided with stops 232 to abut against the leg-engaging retainer 216 to prevent rotation of the shackle assemblies 210 about an essentially horizontal rotation axis.

The invention claimed is:

1. Slaughtering installation for processing poultry which installation is adapted to be used in combination with a conveying assembly for conveying poultry which is suspended from their legs in a transport direction, the slaughtering installation comprising a killing device with a poultry positioning device for positioning the neck region of the poultry suspended from the conveying assembly, the killing device further comprising a cutting device for cutting into the neck and thereby opening at least one blood vessel in the neck region of the poultry, wherein the positioning device comprises a back neck guide along which the back side of the neck of the poultry is guided, and a breast neck guide along which the breast side of the neck of the poultry is guided, both said neck guides extending essentially parallel to the transport direction and define a plane between the neck guides, such that the neck is guided by the neck guides and the neck moves in the plane between the neck guides, wherein the back neck guide is positioned at an elevated position relative to the lower positioned breast neck guide, and wherein the positioning device further comprises a head guide track extending essentially parallel to the transport direction, a lower portion of the head of the suspended poultry being guided along the head guide track while the poultry is conveyed between the neck guides, such that the bill of the poultry is forced in a direction opposite the transport direction.

2. Slaughtering installation according to claim 1, wherein the plane between the neck guides includes an angle, with respect to the vertical, of 10-70°.

3. Slaughtering installation according to claim 1, wherein the back neck guide and the breast neck guide are embodied as two neck guide plates, extending in line with each other at either side of the plane between the neck guides.

4. Slaughtering installation according to claim 1, wherein the head guide track is an essentially horizontally extending plate, which preferably diverges slightly upwards from the horizontal plane such that the head of the bird is guided in an upward direction.

5. Slaughtering installation according to claim 1, wherein the head guide track comprises a retardation device engaging on the head and causing the progress of the head of the poultry to be slowed down compared to the legs of the poultry suspended from the conveying assembly.

6. Slaughtering installation according to claim 1, wherein the cutting device comprises two knives, one knife for cutting into the neck and a vein and possibly also an artery from above, and a second knife to cut into the neck and the other vein and possibly the other artery from below.

7. Slaughtering installation according to claim 1, wherein the cutting device comprises one or more knives comprising an essentially vertical cutting blade, even more preferably, the blade extends essentially parallel to the plane between the neck guides, possibly at an angle with respect to the vertical.

8. Slaughtering installation according to claim 1, wherein the poultry positioning device further comprises a back guide downstream (seen in transport direction) of an entry position in which the poultry comes into contact with the neck guides.

9. Method for slaughtering poultry wherein use is made of a slaughtering installation according to claim 1, the method comprising the following steps:
- suspending the poultry from their legs from a conveying assembly;
- transporting the suspended poultry in a transport direction;
- the poultry entering the killing device at an entry position, in which the neck of the poultry comes into contact with the neck guides;
- the head of the poultry coming into contact with the head guide track such that the bill of the poultry is forced in a direction opposite the transport direction;
- further conveying the poultry in direction past the cutting device;
- the poultry leaving the slaughtering installation at an exit position.

10. Slaughtering installation according to claim 1, which installation is adapted to be used in combination with a conveying assembly for conveying poultry which is suspended from their legs in a transport direction, the slaughtering installation comprising a killing device with a poultry positioning device for positioning the neck region of the poultry suspended from the conveying assembly, the killing device further comprising a cutting device for cutting into the neck and thereby opening at least one blood vessel in the neck region of the poultry,
wherein
the poultry positioning device comprises a wing guide plate with which the wing comes into contact when entering the killing device, which tilted wing guide plate extends essentially parallel to the transport direction and is tilted about 10-70° from the vertical plane, in the direction of the back of the suspended poultry.

11. Conveying assembly comprising an overhead conveyor utilizing shackle assemblies for transporting poultry carcasses through a processing plant, said overhead conveyor including a track and a series of trolleys hanging therefrom to travel therealong, said trolleys being interconnected by a drive chain, wherein each trolley has a hanger projecting downwardly therefrom, wherein each shackle assembly comprises a connection member to connect to the hanger, an elongated rod extending essentially vertically from the connection member and a leg-engaging retainer at the lower end of the rod, wherein the conveying assembly further comprises a guide element disposed generally horizontally below and essentially parallel to the overhead conveyor to engage against the leg-engaging retainer to prevent rotation of the shackle assemblies about an essentially vertical axis,
wherein
the conveying assembly further comprises a guide chain disposed generally horizontally below and essentially parallel to the overhead conveyor, which guide chain is operable synchronously with drive chain and is provided with stops to abut against the leg-engaging retainer to prevent rotation of the shackle assemblies about an essentially horizontal rotation axis.

12. Slaughtering installation for processing poultry which installation is adapted to be used in combination with a conveying assembly for conveying poultry which is suspended from their legs in a transport direction, the slaughtering installation comprising a main killing device with a main poultry positioning device for positioning the neck region of the poultry suspended from the conveying assembly, the main killing device further comprising a main cutting device for cutting into the neck and thereby opening at least one blood vessel in the neck region of the poultry, wherein the slaughtering installation further comprises a back-up killing device comprising a back-up poultry positioning device and a back-up cutting device for cutting into the neck and thereby opening the at least one blood vessel in the neck region of the poultry, which back-up killing device is positioned downstream when seen in direction from where the conveying assembly enters the main killing device.

13. Slaughtering installation according to claim 12, wherein the back-up killing device is provided essentially parallel to and adjacent the main killing device, and essentially parallel to the direction of conveyance.

14. Slaughtering installation according to claim 12, wherein the poultry suspended from the conveying assembly enters the main killing device at an entry position in which the poultry comes into contact with the main poultry positioning device, and is conveyed in direction past the main cutting device until an exit position in which the killed poultry exits the slaughtering installation, and wherein the main cutting device and the back-up cutting device are positioned substantially at the same distance from exit position.

15. Slaughtering installation according to claim 12, wherein the back-up killing device is positioned between a position where the conveying assembly enters the main killing device and a position in which the killed poultry leaves the main killing device.

16. Slaughtering installation according to claim 12, wherein the back-up cutting device are such that the poultry is decapitated.

17. Slaughtering installation according to claim 12, wherein the main cutting device comprises two knives, one for each side of the neck of the poultry.

18. Slaughtering installation according to claim 12, wherein the cutting device cuts at least the carotid arteries, and possibly also the jugular veins of both sides.

19. Slaughtering installation according to claim 12, wherein the main cutting device is such that incisions in the neck can be made, cutting the jugular veins and carotid arteries of both sides, preferably leaving the spinal cord intact.

20. Method for slaughtering poultry wherein use is made of a slaughtering installation according to claim 12, the method comprising the following steps:
- transporting the suspended poultry in a transport direction;
- a first portion, preferably the vast majority, of the poultry entering the main killing device at an entry position;
- the first portion of poultry coming into contact with the main poultry positioning device;
- the remaining poultry which has not entered the main killing device coming into contact with the back-up positioning device at a back-up position, downstream in direction from the entry position;
- further conveying the first portion of the poultry in direction past the main cutting device;
- further conveying the remaining poultry in direction past the back-up cutting device;
- the first portion and remaining poultry leaving the slaughtering installation at a common exit position.

21. Slaughtering installation for processing poultry, which installation is adapted to be used in combination with a conveying assembly for conveying poultry which is suspended from their legs in a transport direction, the slaughtering installation comprising a killing device with a poultry positioning device for positioning the neck region of the poultry suspended from the conveying assembly, the killing device further comprising a cutting device for cutting into the neck and thereby opening at least one blood vessel in the neck region of the poultry,
wherein
   the poultry positioning device comprises a wing guide plate with which the wing comes into contact when entering the killing device, which tilted wing guide plate extends essentially parallel to the transport direction and is tilted about 10-70° from the vertical plane, in the direction of the back of the suspended poultry.

* * * * *